United States Patent
Lanceros Mendez et al.

(10) Patent No.: US 10,590,296 B2
(45) Date of Patent: Mar. 17, 2020

(54) PIEZORESISTIVE INK, METHODS AND USES THEREOF

(71) Applicants: UNIVERSIDADE DO MINHO, Braga (PT); DYNASOL ELASTOMEROS S.A., Madrid (ES)

(72) Inventors: Senen Lanceros Mendez, Braga (PT); Pedro Filipe Ribeiro Da Costa, Adaúfe (PT); Juliana Alice Ferreira Oliveira, Vila Nova de Famalicão (PT); Bruna Ferreira Gonçalves, Braga (PT); Sergio Corona Galvàn, Madrid (ES)

(73) Assignees: UNIVERSIDAD DO MINHO, Braga (PT); DYNASOL ELASTOMEROS S.A., Madrid (ES)

( * ) Notice: Subject to any disclaimer, the term of this patent is extended or adjusted under 35 U.S.C. 154(b) by 0 days.

(21) Appl. No.: 16/067,001

(22) PCT Filed: Jan. 2, 2017

(86) PCT No.: PCT/EP2017/005004
§ 371 (c)(1),
(2) Date: Jun. 28, 2018

(87) PCT Pub. No.: WO2017/114978
PCT Pub. Date: Jul. 6, 2017

(65) Prior Publication Data
US 2019/0023929 A1    Jan. 24, 2019

(30) Foreign Application Priority Data
Dec. 29, 2015   (PT) .................................. 109061

(51) Int. Cl.
| | | |
|---|---|---|
| C09D 11/52 | (2014.01) | |
| C09D 11/106 | (2014.01) | |
| C09D 11/033 | (2014.01) | |
| G01B 7/16 | (2006.01) | |
| G01L 1/18 | (2006.01) | |

(Continued)

(52) U.S. Cl.
CPC ............ *C09D 11/52* (2013.01); *C09D 11/033* (2013.01); *C09D 11/037* (2013.01);
(Continued)

(58) Field of Classification Search
None
See application file for complete search history.

(56) References Cited

U.S. PATENT DOCUMENTS

| | | | | |
|---|---|---|---|---|
| 2009/0283304 A1* | 11/2009 | Winoto | .................. | B82Y 10/00 |
| | | | | 174/257 |
| 2012/0055257 A1* | 3/2012 | Shaw-Klein | .......... | H01L 41/081 |
| | | | | 73/780 |

FOREIGN PATENT DOCUMENTS

WO      2004/097853  A1    11/2014

OTHER PUBLICATIONS

P. Costa et al: "Effect of butadiene/styrene ratio. block structure and carbon nanotube content on the mechanical and electrical properties of thermoplastic elastomers after UV ageing", Polymer Testing, vol. 42. Apr. 1, 2015 (Apr. 1, 2015), pp. 225-233.
(Continued)

*Primary Examiner* — Katie L. Hammer
(74) *Attorney, Agent, or Firm* — Leason Ellis LLP

(57) ABSTRACT

The present disclosure relates to a piezoresistive ink composition for sensors production. This ink, change linearly their electrical resistivity with an applied deformation and can easily recover when the external applied stress is released. The composition comprises flexible polymers as thermoplastic elastomers from the styrene-butadiene-styrene family (SBS, SEBS or others), nanostructures of carbon or metal, polar solvents and dispersive agents. With this ink, the user can print the sensor with any desired geometry and use different printing techniques, including drop casting, spray, screen and inkjet printing.

16 Claims, 3 Drawing Sheets

(51) Int. Cl.
  *C09D 11/037* (2014.01)
  *C08K 3/04* (2006.01)
  *C08K 3/08* (2006.01)
  *C08K 5/41* (2006.01)
  *C08L 71/02* (2006.01)

(52) U.S. Cl.
  CPC .............. *C09D 11/106* (2013.01); *G01B 7/16* (2013.01); *G01B 7/20* (2013.01); *G01L 1/18* (2013.01); *C08K 3/041* (2017.05); *C08K 3/042* (2017.05); *C08K 3/046* (2017.05); *C08K 3/08* (2013.01); *C08K 5/41* (2013.01); *C08K 2003/0806* (2013.01); *C08K 2003/0831* (2013.01); *C08K 2201/001* (2013.01); *C08K 2201/011* (2013.01); *C08L 71/02* (2013.01)

(56) References Cited

OTHER PUBLICATIONS

Zhi Feng Wang et al: "Processing and Modeling of Multi-Walled Carbon Nanotube/Styrene-Butadiene-Styrene (SBS) Composites for Force Sensing", Nanotechnology, Jul. 1, 2009 (Jul. 1, 2009). pp. 756-757.

Ribeiro S et al: "El ectrospun styrene-butadiene-styrene elastomer copolymers for tissue engineering applications: Effect of butadiene/ styrene ratio. block structure. hydrogenation and carbon nanotube loading on physical properties and cyto". Composites Part B: Engineering, Elsevier, UK. vol. 67, Jun. 30, 2014 (Jun. 30, 2014), pp. 30-38.

* cited by examiner

PIEZORESISTIVE INK, METHODS AND USES THEREOF

CROSS-REFERENCE TO RELATED APPLICATIONS

This application is a U.S. National Stage Application under 35 U.S.C. § 371 of International Patent Application No. PCT/EP2017/050040, filed Jan. 2, 2017, which claims priority to Portugal Application No. 109061, filed Dec. 29, 2015, which are hereby incorporated by reference in their respective entireties.

TECHNICAL FIELD

The present disclosure relates to an ink composition that consists in a polymer-based ink that when it's printed accordingly to a geometry desired, allows the development of piezoresistive sensors. The composition comprises conductive nanostructures, a thermoplastic elastomer polymer and a dispersive agent, that can be applied on different substrates through different printing techniques such as drop casting, spray, screen or inkjet printing. This disclosure can be applied in several areas such as electronics, biomedical or automotive.

BACKGROUND

Polymer based strain gauges have been patented to work as piezoresistive sensors or transducers in the last few decades, as for example in U.S. Pat. No. 5,505,093A, GB2141548A, U.S. Pat. Nos. 8,661,917B2, 4,765,930A, 6,951,143B1 and US20140260653A1. In general, these documents reveal materials for the development of force sensors or devices comprising conductive polymers and silicone rubbers as matrices. The materials used as electrical conductors are based on carbon nano- and microstructures, conductive polymers or inorganic fillers.

Piezoresistive behaviour can be described as a mechanical stimulus that induces in the sensor a change in electrical resistivity, as mentioned in document U.S. Pat. No. 2,951,817, which describes a polyvinyl chloride polymer matrix with manganese dioxide as filler, where the electrical resistance changes throughout a very wide range of values in response to very small deformations. Resistive deformable sensors touch screens for application in electronic devices are presented in the document US20100123686A. Piezoresistive pressure sensors chips that are exposed to the external pressure medium directly have been disclosed in U.S. Pat. No. 8,567,256B2, as well as pressure sensors for the measurement of compression and tension of materials in different applications, which are disclosed in WO 2007044307 A1.

Among the different used electrical conductive nanostructures, carbon nanotubes (CNTs) have received special attention in research and industry, as observed in documents U.S. Pat. Nos. 7,318,351 B2 A or 7,553,681 B2. By increasing fillers content on the polymeric matrix until a critical amount it is observed a large increase in the electrical conductivity of the inks. After this region, the conductivity tends to stabilize. This phenomenon is referred as the electrical percolation threshold, and this parameter is dependent on the polymer matrix, nanostructures and preparation methods. The percolation threshold plays an important role on the piezoresistive response in these kind of composites, as the ink formulation should work preferentially around that concentration.

The majority of the referenced documents in this area, such as U.S. Pat. No. 7,318,351B2, and WO2007044307A1 reveal the development of piezoresistive pressure sensors for micro and macro deformations. In the WO2007044307A1 document the nitrogen implantation in different polymers and conductive polymer materials using polyaniline (PANI) as piezoresistive thin films, which shows interesting piezoresistive properties and can be implemented directly in whole substrate. These are presented as an alternative to metal film and silicon piezoresistive sensors. The GB2141548A discloses a transducer incorporating an electrical resistance strain gauge element in the form of a conductive polymer comprising a dispersion of electrically conductive or resistive particles in an electrically insulating organic polymer. The particles comprise a dispersion of electrically conductive carbon in an organic polymer such as epoxy, alkyd, polyester, acrylic or silicon materials or copolymers thereof. The U.S. Pat. No. 5,505,093A discloses that certain thermally stable homogeneously conductive films unexpectedly exhibit effective piezoresistivity, when employed in the measurement of strain, for the measurement of large flexural deformations. These transducers can comprise either one of two alternative types of polymers, i.e., solvent soluble polyaniline conducting polymers, or ion-implanted polymers. The polymers are patternable by photolithography. The U.S. Pat. No. 4,708,019A discloses that certain piezoresistive blends of doped acetylene polymers and elastomers can be employed in the measurement of strain due to stress applied to a sample. Pressure transducers, such as strain gauges, can be fabricated employing such blends. These transducers contain a polymeric element capable of deformation in response to stress applied to the sample. The polymeric element comprises a piezoresistive blend of an acetylene polymer doped to make it electrically conductive.

A related document U.S. Pat. No. 9,032,804, deals with large-area extensible pressure sensor for textiles surfaces, comprising a support or substrate on which a conductive and piezoresistive paste or ink is printed. This paste or ink is composed by conductive or graphite materials on a polymeric matrix of elastic deformable material such as silicone.

These facts are disclosed in order to illustrate the technical problem addressed by the present disclosure.

GENERAL DESCRIPTION

The present disclosure relates to a composition comprising a polymer-based ink that when it's printed accordingly to a desired geometry allows the development of piezoresistive sensor for the measurement of forces and deformations up to 40% and above.

None of the solutions of the state of the art are based on a thermoplastic elastomer as a matrix and nanostructures, like carbon or metal nanotubes or nanowires, as conductive materials for large strain sensors, being the ink itself piezoresistive. With this ink it is possible to produce a sensor with any geometry, in particular suitable for large deformation measurements, which is one of the main issues of the present state of the art.

The present subject matter discloses a polymer composites inks based on thermoplastic elastomers from the styrene-butadiene-styrene family and carbon or metal nanostructures that have demonstrated their potential as high-performance or multifunctional materials and have become one of the most attractive domains in material science area. Through the incorporation of carbon nanostructures into the polymers, the main characteristics of the polymer matrix such as easy processing, tailorable mechanical properties including reversible large deformation stretchability, can be combined with the excellent mechanical, thermal and electrical properties of the nanostructures. Due the overall properties of the composites matrixes strong efforts have been carried out on the development of polymer composite inks that can be processed by different printing technologies, allowing economic and efficient sensor development and simple integration in to devices.

In the present disclosure ink is a liquid or paste (at 20° C.) that contains pigments or dyes and is used to color a surface to produce an specific design, in particular printable ink, more in particular printable ink containing green solvents.

The present disclosure describes an ink based on a polymer matrix from the styrene-butadiene-styrene (SBS) family (or thermoplastic elastomers (TPE) with similar or related characteristics), reinforced with nanostructures like carbon, metal or their combination nanoparticles, for the development of sensors able to measure large deformation (40% or above) applied by printing technologies. They can be also implemented as soft sensors for force/pressure or bending. The polymer matrix, which provides elasticity and stretchability to the piezoresistive sensors, is based on TPEs triblock copolymers based on styrene-butadiene-styrene (SBS). Further, together with the form of ink, which the objective of the present disclosure, SBS-based TPEs can be processed by conventional thermoplastic processing methods, showing low-temperature flexibility, chemical stability and electrical insulator properties. The variety of styrene/butadiene (S/B) block copolymers constitutes an important class of TPEs, influencing essentially their mechanical properties, as large elasticity and low mechanical hysteresis. Different molecular architectures and block lengths allow tailoring the mechanical properties of the TPEs leading to their interesting properties for the development of piezoresistive sensors. Further, styrene-ethylene/butylene-styrene (SEBS) copolymers from the same family allow the development of biocompatible sensors and improved ozone resistance. Finally, combining the overall properties of the matrixes and CNTs or metal nanostructures with green chemistry solvents, environmentally friendly inks are produced for large stretchable piezoresistive sensors. SBS family based polymers with controlled S/B ratio, block structures length or viscosity combined with electrical properties of the CNTs becomes allow thus the development of the piezoresistive sensors inks for small and large strain sensors (up to 40% and above) with tailored with piezoresistive properties for specific applications. The inks formulation can be tailored for specific applications varying conductive filler contents, viscosity through solvent/polymer ratio and SBS based polymer characteristics.

In an embodiment, the piezoresistive stretchable inks can be applied in the development of new devices and microelectronic systems such as wearable health monitoring devices, human-motion capturing systems and tactile sensors for robots, among others. Flexible and transparent sensors are also possible with these inks by applying them in submicron thickness, (below 0.5 microns), allowing the development of transparent tactile interfaces. The produced inks allow implementation by spray, screen and inkjet printing techniques (as shown in FIG. 1) to develop piezoresistive devices on several substrates.

In an embodiment, due the composition of such inks, based on thermoplastic elastomer (TPEs) matrices from the styrene-butadiene-styrene (SBS) family, nanostructures of carbon or metal and polar solvents (common and/or green), elastomeric mechanical properties are achieved, allowing the fabrication of force and deformation piezoresistive sensors. When the applied deformations are released, the shape of the sensors is recovered due the mechanical properties of the materials, with low mechanical hysteresis even at large deformations. Thermoplastic elastomers matrices from the styrene-butadiene-styrene family show properties similar to rubbers but with the advantage of being processed with methods similar to thermoplastics polymers, without vulcanization. So, the elasticity of the sensor is determined by the matrix and increases with increasing butadiene content into SBS and SEBS. The butadiene/styrene ratio in SBS vary between 45/55 and 80/20 and the (ethylene/butylene)/styrene in the SEBS vary between 70/30 and 67/33, being possible other formulations.

In an embodiment, the nanostructures, including nanoparticles, nanotubes, nanowires, nano-plates and related materials and structures, made of carbon or metal, allow tailoring the electrical conductivity of the materials and the piezoresistive response is strongly influenced by these carbon nanostructures. The conductive filler functionalization (covalent or non-covalent), dispersion method or surfactant agent addition allows optimizing the overall properties, essentially the electrical and piezoresistive response of the sensors.

In an embodiment, the use of proper solvent is important to obtain excellent mechanical and thermal properties of the polymer matrices, together with the proper formulation, in terms of molecular conformation and copolymer ratio, of the styrene-butadiene-styrene. The sensors homogeneity after solvent evaporation is critical to allow the stress-strain deformation cycles suitable for these sensors.

In an embodiment, the polymer block structures can be radial, linear or multi-arm.

In an embodiment, the use of polar solvents that can provide a suitable dispersion of the carbon or metal nanostructures, that easily dissolve the polymer and with fast evaporation after sensor printing, is important to assure a good functionality of the sensor. Newly developed green solvents can replace common solvents showing similar properties for piezoresistive sensors, addressing therefore one of the main concerns nowadays, which is the use of green materials and chemistry for lower environmental impact.

All these different components and processes (matrix, solvent, nanostructures and preparation process, and also dispersive agent) have strong relevance in determining the piezoresistive response of the sensors.

The electrical resistance of the inks changes with applied stress or strain. These changes can be adjusted depending on the specific SEBS or SBS formulation, filler content type and content and printing method. Under stress or deformation, the piezoresistive variation of the resistance of the materials can be up to 10% or more, depending on the aforementioned parameters.

The geometry of the sensors can improve the piezoresistive sensibility and their optimization should take into account the printing technique and the final application of the sensor.

The inks can be deposited in a single layer but a multilayer printing is possible, whenever required by the final application.

This ink can be applied in different substrates, including metals, polymers or composites, among others, as well as directly printed with specific patterns. These inks show a low temperature curing process and shows excellent adhesion to several substrates. Besides these characteristics, the solvent options comprises several common and/or green solvents.

It is disclosed a composition polymer based ink for piezoresistive sensor production comprising thermoplastic elastomers selected from styrene-butadiene-styrene or styrene-ethylene/butalyne-styrene or their derivatives; nanostructures; dispersive agents and polar solvents.

The present disclosure relates to a piezoresistive ink composition for use in force or deformation sensors.

The present disclosure relates to a piezoresistive ink, in particular a printable piezoresistive ink composition, comprising:
  a thermoplastic elastomer polymer (TPE) selected from SBS or SEBS, or its derivatives or mixtures thereof;
  conductive nanostructures of carbon or metal or a combination thereof as a filler;
  a solvent selected from a group consisting of toluene, clorophorme, methoxycyclopentane (CPME also know as Cyclopentyl methyl ether), 1,3-dioxolane, dimethylformamide, a combination thereof; and
  a dispersive agent comprising sodium dodecyl sulfate (SDS), cetyl trimethylammonium bromide (CTAB), citric acid, Triton or mixtures thereof as surfactant.

In an embodiment, the thermoplastic elastomer polymer selected is preferably SBS and/or SEBS.

This new ink, change linearly their electrical resistivity with an applied deformation and can easily recover when the external applied stress is released. With the piezoresistive ink of the present subject matter, the user can print the sensor with any desired geometry and use different printing techniques, including drop casting, spray, screen and inkjet printing.

In an embodiment for better results, the amount of thermoplastic elastomer polymer is between 2.5-30% wt/wt ink, preferably 10-30% wt/wt ink, more preferably 20-30% wt/wt ink.

In an embodiment for better results, the amount of solvent can be between 30-90% wt/wt inkn, preferably 50-80% wt/wt ink.

In an embodiment for better results, the amount of conductive nanostructures is between 0.5-6% wt/wt polymer, preferably 0.5-3% wt/wt polymer.

In an embodiment for better results, the ratio of solvent/polymer (v/v) may be between 3/1-12/1, preferably 5/1-10-1.

In an embodiment for better results, the surfactant may be sodium dodecyl sulfate, Triton.

In an embodiment for better results, the amount of dispersive agent is up to 20% wt/wt filler.

In an embodiment for better results, the amount of dispersive agent is up to 15% wt/wt filler, preferably is up to 2% wt/wt filler.

In an embodiment for better results, the amount of the surfactants in the dispersive agent is up to 15% wt/wt filler, preferably is up to 2% wt/wt filler.

In an embodiment for better results, the relation of surfactant with respect to the conductive filler is between 1:2 to 1:10 (vfiller/vsurfactant).

In an embodiment for better results, the metal is silver, gold, platinum, or mixtures thereof, preferably silver, gold or mixtures thereof.

In an embodiment for better results, the ratio (wt/wt) of butadiene/styrene in SBS range between 45/55 to 80/20.

In an embodiment for better results, wherein the ratio (wt/wt) of (ethylene/butylenes)/styrene in SEBS varies between 70/30 to 67/33.

In an embodiment for better results, for small strains the percentage of conductive nanostructures is 0.5-3% wt/wt solution for strains until 0.01%.

In an embodiment for better results, for strains up to 80% the percentage of conductive nanostructure is 3-6% wt/wt solution.

In an embodiment for better results, the conductive nanostructures are nanoparticles, nanotubes, nanowires, nanoplates.

In an embodiment for better results, the carbon conductive nanostructures is selected from a group consisting of carbon black, graphite, single carbon nanotubes, multi-walled carbon nanotubes, graphene, and combinations thereof.

In an embodiment for better results, the resistance variation of the ink is up to 10% and above.

In an embodiment for better results, the viscosity ranges are important. Namely:
  viscosity ranges between 4000 and 40000 cP (m·Pa·s) at 20° C. for screen printing,
  viscosity ranges between 4-30 cP (m·Pa·s) at 20° C. for inkjet printing and;
  viscosity ranges between 1 and 50 cP (m·Pa·s) at 20° C. for spay printing.

The viscosity may be calculated by several methods, in the present disclosure the viscosity was determined by a viscosmeter using ASTM D7042 (16e3)-EN 16896-DIN 51659-2.

In an embodiment for better results, the ink is a printable ink.

Another aspect of the present invention is relate to a sensor comprising a piezoresistive ink discloses in the present subject-matter, in particular force sensors or deformation sensors.

Another aspect of the present invention is relate to a method for production of the piezoresistive ink discloses in the present subject-matter comprising the following steps:
  mixing conductive nanostructures of carbon or metal, or a combination thereof, with a solvent selected from a group consisting of toluene, clorophorme, methoxycyclopentane, 1,3-dioxolane, dimethylformamide, or a combination thereof, in an ultrasonic bath;
  adding a thermoplastic elastomer polymer selected from styrene-butadiene-styrene or styrene-ethylene/butylene-styrene or a combination thereof;
  stirring until complete dissolution;
  adding a dispersive agent comprising sodium dodecyl sulfate and triton.

In an embodiment, the butadiene/styrene ratio in SBS can vary between 45/55 and 80/20.

In an embodiment, the (ethylene/butylene)/styrene in the SEBS can vary between 70/30 and 67/33.

In an embodiment, the composition comprises 0.5-6% wt of nanostructures/polymer.

In an embodiment, 0.5-3% wt of nanostructures/polymer is used for high sensitivity small strain sensors (up to 0.01% deformations) and 3-6% wt of nanostructures/polymer is used for large strains (up 40% and above).

In the embodiment, the nanostructures are nanoparticles, nanotubes, nanowires, nano-plates and related structures.

In an embodiment, the nanostructures are made of carbon.

In another embodiment, the nanostructures are made of metal.

In another embodiment, the nanostructures are a combination of carbon and metal.

In an embodiment, the carbon nanostructures are carbon black, graphite, single and multi-walled carbon nanotubes, graphene, and combination thereof.

In an embodiment, the metal nanostructures are nanotubes, nanowires and/or spheres from platinum, silver, gold or other metals, and combination thereof.

In an embodiment, the dispersive agents is solution comprising different concentrations of sodium dodecyl sulfate (SDS), cetyl trimethylammonium bromide (CTAB), citric acid or Triton, used as surfactants of the different nanoparticles. Depending of the conductive filler, the amount of surfactant can be from in following weight relation with respect to the to the filler (filler:surfactant): 1:2 to 1:10, being preferably the relation 1:2 for most of the fillers.

In an embodiment, the amount of dispersive agent/surfactant varies from 1:2 to 1:10 in weight with respect to the filler (filler:surfactant).

In an embodiment the polar solvents are selected from a group consisting of toluene, clorophorme, methoxycyclopentane (CPME), 1,3-dioxolane, dimethylformamide, other similar solvents or a combination thereof.

In an embodiment, the ratio of solvent/polymer is between 3/1 and 12/1.

In an embodiment, wherein the resistance variation of the inks with increasing deformation can reach up to 20%, preferably up to 10%. The resistance variation may be calculated by several methods, in the present disclosure the resistance variation was determined by the I-V characteristics, four wire method, and by direct measurement of the resistance by a multimeter. An aspect of the disclosure is that the ink can be applied accordingly to any kind of geometry and became functional.

Another aspect of the disclosure is that this ink can be applied through spray, drop casting, inkjet and screen. The present disclosure also relates to a method for production of the piezoresistive ink now disclosed comprising the following steps:
 place in an untrasonic bath the nanostructures with the solvent;
 add the TPE to the solution and place it in magnetic stirring until complete dissolution;
 finally add the dispersive agent.

This disclosure also relates to the use the piezoresistive ink for the production of sensors, in particular for printing techniques like drop casting, inkjet, screen and spray printing.

BRIEF DESCRIPTION OF THE FIGURES

The following figures provide preferred embodiments for illustrating the description and should not be seen as limiting the scope of present disclosure.

DETAILED DESCRIPTION

The present subject-matter discloses a piezoresistive ink based on polymer matrices from thermoplastic elastomers of the styrene-butadiene-styrene family or hydrogenated rubber styrene-ethylene/butylene-styrene having different butadiene/styrene ratio and copolymer block structure. Their exceptional mechanical properties with large maximum strain and low mechanical hysteresis in mechanical stress-strain cycles provide the materials with suitable properties for large strain and soft pressure sensors.

Figure 1:
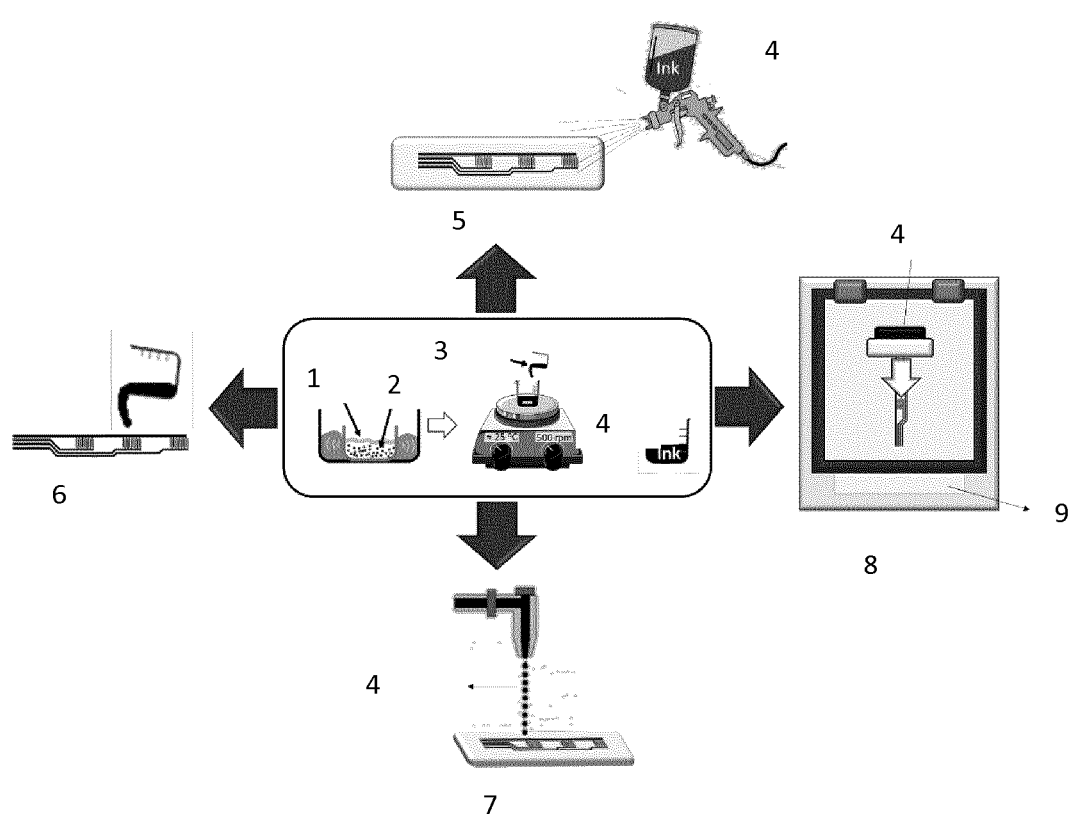
FIG. 1—Experimental procedure for the preparation of the piezoresistive inks, with carbon nanostructures dispersed and TPEs dissolution to produce the ink (center of the image) and different printing techniques that can be used to print the piezoresistive sensors, including drop casting, inkjet, screen and spray printing, among others. 1—represents the solvent; 2—represents the carbon nanotubes; 3—represents the polymer; 4—represents the piezoresistive ink; 5—represents the spray printing; 6—represents the drop casting; 7—represents the inkjet printing; 8—represents the screen printing and 9—represents the substrate.

The experimental method processing the piezoresistive inks follows the following steps (FIG. 1):

In an embodiment, specific amounts of carbon nanotubes (CNT) are added to solvent and placed in ultrasonic bath for CNT dispersion. This step is important to tune the electrical properties of the piezoresistive ink. The CNTs can be chemically functionalized by covalent attachment of functional groups or the non-covalent adsorption of functional molecules onto the surface of the CNTs in order to tailor ink electrical conductivity and dispersion within the ink formulation.

In an embodiment, the CNT content relatively to the polymer matrix depends on the specific application, generally varying between 0.5 to 6 weight percentage (wt %) in the CNT/polymer ratio.

In an embodiment, the solvent used is toluene or related solvent and the solvent/polymer ratio ranges from 3/1 to 12/1 depending on the physical properties (including density, viscosity and electrical conductivity, among others) of the piezoresistive ink and the specific requirements of the printing techniques.

In an embodiment, after keeping solvent and CNT in ultrasonic bath the TPE are added and placed in magnetic stirring until complete dissolution.

In an embodiment, a dispersive agent involving an affinity functional groups containing block copolymer solution as sodium dodecyl sulfate (SDS), cetyl trimethylammonium bromide (CTAB), citric acid or Triton, or mixtures thereof as surfactants is further used in order to allow proper ink rheology.

A proper ink rheology is important because it is related to the application technology of the ink and the final performance of the sensor.

The control of the viscosity of the inks depend on the application. The homogeneity of the solution and the sedimentation of the nanoparticles on the ink is crucial for their piezoresistive properties.

The viscosity of the ink varies between 4000 and 40000 cP (m·Pa·s) for screen printing, between 4 and 30 cP (m·Pa·s) for inkjet printing and between 1 and 50 cP (m·Pa·s) for spray printing.

Before use of the inks, magnetic stirring and/or ultrasonic bath are recommended.

Figure 2:
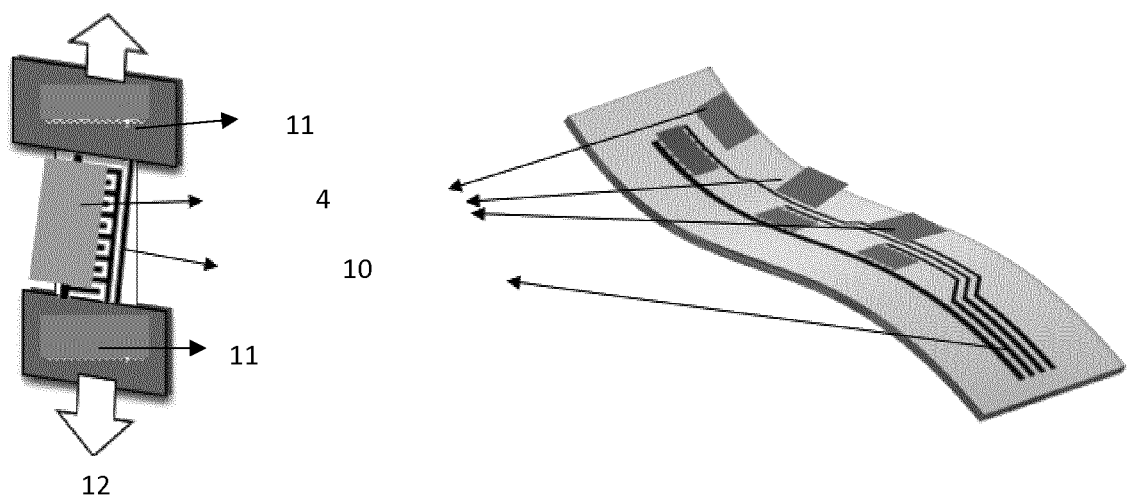
FIG. 2—Illustration of piezoresistive sensors response, for both stretching (left) and bending (right). 10—represents the conductive pattern; 11—represents a clamp; 12—represents the stretching direction.

These inks can be easily spread or printed by different techniques directly in different substrates (FIG. 2) with excellent adhesion and with a short curing time. The curing time depends on temperature. It can be performed at room temperature, but the curing time strongly decreases with increasing temperature, being less than 10 min at 60-80° C., which can be less if the temperature is increased or with specific drying procedures, such as infrared treatment, down to less than 1 minute. The curing time also depend on the solvent and the applied spread/printed technique.

Figure 3:
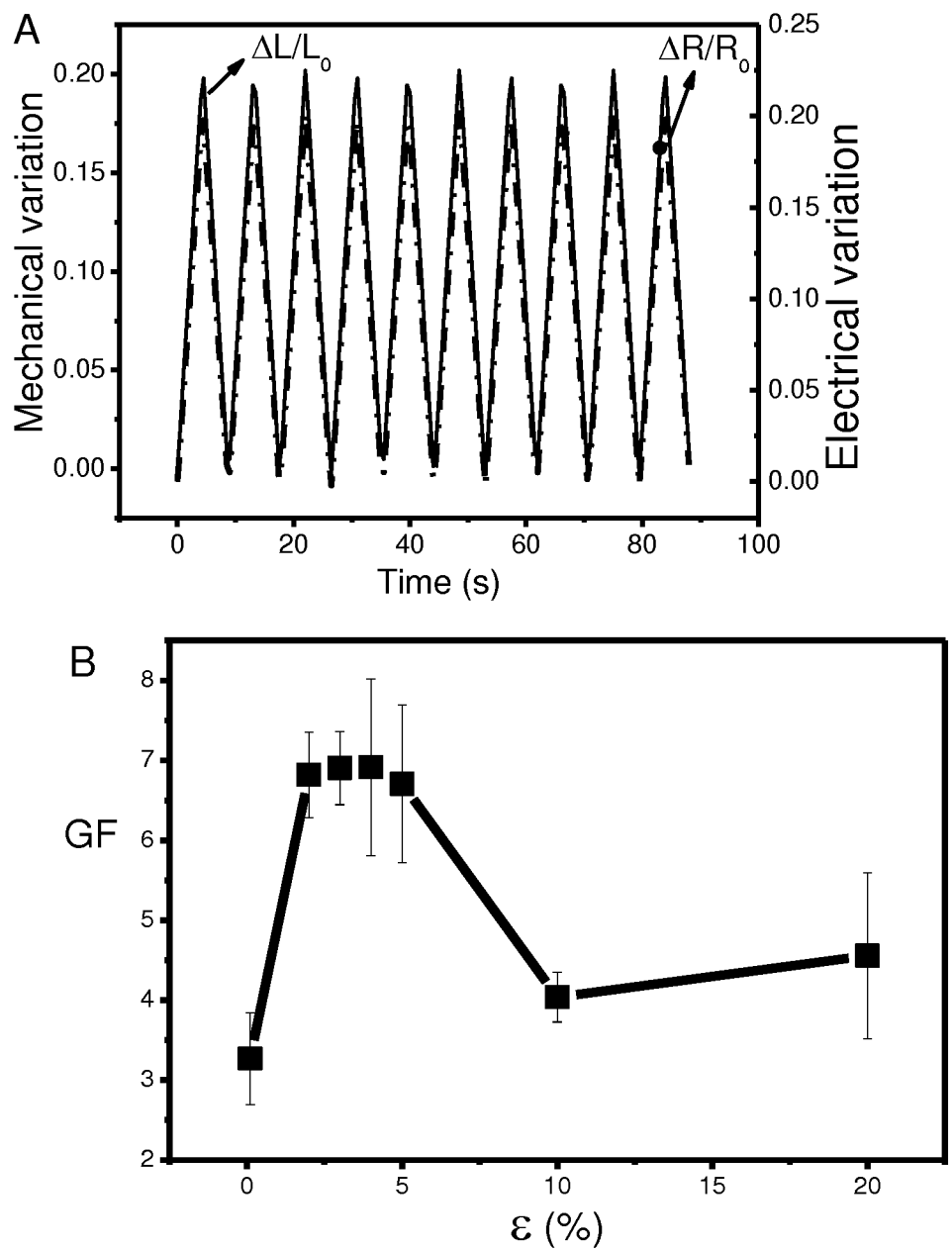
FIG. 3—Piezoresistive response during stress-strain cycles for inks with certain amount of carbon nanostructures. A) Linearity during 10 stress-strain cycles and B) GF values from 0.1 to 20% strain for the same piezoresistive inks.

The stretchable sensor sensibility is determined by the piezoresistive response (FIG. 3) that is quantified by the gauge factor (GF) which is defined as the percentage change in resistance per unit strain:

$$GF = \frac{dR/R_0}{dl/l_0} \quad (1)$$

In equation 1, the strain is represented by $dl/l_0$ ($\varepsilon$), where dl means the relative change in mechanical deformation and $l_0$ means the initial length. The resistance change with strain is represented by $dR/R_0$, where dR means relative change in electrical resistance and $R_0$ means the initial electrical resistance. The change in resistance is affected by the geometric effect and by the intrinsic piezoresistive effect of the material with applied strain. So, the fractional resistance change is dependent on two effects:

$$dR/R = 1 + 2v + \frac{d\rho/\rho}{\varepsilon} \quad (2)$$

where the geometrical effect is represented by $(1+2v)$, on which v represents the Poisson's ratio (usually between 0.35 and 0.5 for TPEs matrixes), and the intrinsic piezoresistive effect by $$\left(\frac{d\rho/\rho}{\varepsilon}\right).$$

The geometric effect by itself contributes to a GF in the range of 1.7-2.0.

Characterization of the Obtained Inks

Elastomers and thermoplastics elastomers are known for their capability to exhibit high deformation capability and high electrical resistance.

The mechanical properties of CNT/SBS and CNT/SEBS inks show the typical curves of thermoplastic elastomers. The maximum strain is larger than 700%, reaching close to 2000% for some inks. The large deformation behavior of both used TPEs and their composites is the required for large strain sensors applications. The mechanical properties of the final sensors can be tailored by matrix composition (S/B ratio) and carbon nanostructures content. Furthermore, these materials show low mechanical hysteresis and easy recovery, with the mechanical hysteresis increasing with the applied stain and styrene content.

The electrical conductivity increases several orders of magnitude with increasing high aspect ratio (nanotubes and/or nanowires) carbon or metallic content in the composites and the typical electrical percolation threshold of these composites inks is between 0.5 to 1.5 wt % of metallic or carbon nanostructures. The electrical conductivity shows a large increase on these inks materials until 2 wt % of filler content, after that concentration the electrical conductivity shows a slight increase. This allows to tailor the electrical resistivity (inverse of the electrical conductivity) of the inks from hundreds of Ohm to few MOhms.

The piezoresistance is determined by the linear correlation between the electrical resistances and strain (FIG. 3A). The piezoresistive sensibility (GF value) determines the piezoresistive properties of inks, the higher this value, the larger the sensitivity of the sensor to the applied strain (FIG. 3B).

The carbon nanostructure content is critical in determining the printed materials piezoresistive properties, as well as the sensibility or maximum deformation of the sensor application.

The piezoresistive inks involved in this allow printing sensors with GF values that can reach up to GE~10 (FIG. 3B). Further, they are suitable for low and large deformations with higher sensibility. Strains up to 40% and above can be accurately measured adapting the inks to a specific application. Furthermore, the TPEs matrices can be adapted to application too, changing butadiene/styrene ratio to provide specific elasticity to the piezoresistive sensor. The biocompatibility can be offered by the SEBS matrices, being FDA approved.

Embodiment

In an embodiment, the thermoplastic elastomer Calprene CH-6120, a Styrene-Ethylene/Butylene-Styrene (SEBS) copolymer with a ratio of Ethylene-Butylene/Styrene of 68/32 and a molecular weight of 245.33 g/mol, supplied by Dynasol. Multi-walled carbon nanotubes (MWCNT) were supplied by Nanocyl: reference NC7000, purity of 90%, length of 1.5 µm and outer mean diameter of 9.5 nm. Cyclopentyl methyl ether (CPME) was supplied from Carlo Erba with a density of 0.86 g/cm3 at 20° C., and Sodium dodecyl sulfate (SDS) (sigma).

MWCNT/SEBS composites with 0, 0.5, 1, 2, 4, and 5 MWCNT weight percentage (wt %) were prepared by dispersing the respective mass loading in the CPME solvent within an ultrasound bath (ATU, Model ATM40-3LCD) for 5 h at room temperature. The solutions were prepared with the dispersing agent Sodium dodecyl sulfate (SDS) in proportions with respect to the MWCNT (MWCNT:SDS) of 1:2; 1:6 and 1:10. This solvent was selected in order to replace toluene, which has been previously used for MWCNT dispersion and SEBS dissolution (Costa, P.; Ribeiro, S.; Botelho, G.; Machado, A. V.; Mendez, S. L. Polymer Testing 2015, 42, 225-233.). Toluene is consider a health and environmentally dangerous solvent by the American Chemistry Society (ACS). In a scale of 1 to 10, toluene shows a classification of 5 for safety, 7 for health, and 6, 6 and 2 for air, water and soil environmental risks (ACS Green Chemistry Institute, P. R. S. S. G., 2011). For these reasons and due to the increase application of these materials by solvent based printing technologies, it is necessary to replace toluene by a greener solvent. CPME is a green solvent and a valid replacement for toluene due to its physico-chemical characteristics. Further, it shows a boiling point of 106° C., lower than toluene (111° C.), allowing a faster evaporation of the solvent. Sodium dodecyl sulphate (SDS) is used as dispersing agent though others such as Triton or CTBA can be also used. After a good dispersion of the nanofillers was achieved, SEBS was added with a polymer/solvent ratio of 1:6 (grams of polymer to ml of solvent) and the solution was magnetically stirred at room temperature until complete dissolution of the copolymer. The MWCNT/SEBS films were then prepared by solution casting on a clean glass substrate and let to dry, at room temperature, for 24 h until total solvent evaporation. The films thickness can be tailored between 50 and 300 µm.

After the optimization of the materials, piezoresistive sensors were prepared by screen and spray printing techniques and deposited on solvent casted (1 g of SEBS to 6 ml of CPME) SEBS films.

Screen Printing

Screen printing was performed with a home-made set-up with a metallic base structure supporting the screen. With respect to the printing procedure, the piezoresistive and conductive inks are pressed using a squeegee over the screen placed at 100 mm distance of the polymer substrate. The screen (from Sefar) shows 62 monofilaments by cm with a tension of 17 N.

The screen printed sensors (FIG. 3A) are formed by three interdigitated geometries formed by 11 conductive digits each with 0.8 mm width and 0.8 mm distance between them. The piezoresistive ink was deposited over the conductive interdigitated patters with an area of 3×3 cm.

Screen printable ink formulations for the conductive and active piezoresistive layers are formulated as follows: The piezoresistive ink is prepared with a polymer/solvent (SEBS/CPME) ratio of 1:6 (g:ml) and the conductive ink with a relation of 1:13 (g:ml). The viscosity of the piezoresistive and conductive inks can be in the 744-1490 cP and 881-1615 cP range, respectively, for the development of sensors with suitable characteristics, under the present fabrication conditions.

Spray Printing

In an embodiment, spray printing was achieved with a commercial air pressure pistol with a pressure between 3 and 5 bar and at 100 to 200 mm distance between pistol and substrate.

The piezoresistive ink for spray printing was prepared with a polymer/solvent (SEBS/CPME) ratio of 1:8 (g:ml) and the conductive ink with a relation of 1:19 (g:ml). Thus, the viscosity ranges between 244-407 cP and 89-166 cP, for the piezoresistive and the conductive inks, respectively.

The spray printing pattern is formed by 7 conductive lines with 5 mm distance between them, the area of each piezoresistive sensor being 5×20 cm.

The microstructure of the obtained composites and the dispersion of the MWCNT was analyzed by scanning electron microscopy (SEM-FEI-NOVA NanoSEM 200).

TABLE I

Characterization of the ink of the present disclosure namely: strain, conductivity and GF

| | Conductivity $(\Omega m)^{-1}$ | GF | Strain (%) |
|---|---|---|---|
| Multiwall Carbon Nanotubes/SEBS; 5% wt MWCNT content; MWCNT:SDS of 1:2 | 0.1 | 1.5 | 80% |
| Multiwall Carbon Nanotubes/SEBS; 2% wt MWCNT content; MWCNT:SDS of 1:2 | 1E−2 | 2 | 5% |
| Multiwall Carbon Nanotubes/SBS; 5% wt MWCNT; MWCNT:SDS of 1:2 | 1E−2 | 18 | 20% |

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A printable piezoresistive ink comprising:
    30-90% wt/wt ink of a thermoplastic elastomer copolymer selected from the group consisting of styrene-butadiene-styrene (SBS) and styrene ethylene butylene styrene (SEBS) and mixtures thereof;
    a filler comprising conductive nanostructures of carbon or metal or a combination thereof;
    2.5-30% wt/wt ink of a solvent selected from the group consisting of: chloroform, methoxycyclopentane, 1,3-dioxolane, dimethylformamide, or combinations of the foregoing; and
    a dispersive agent comprising, as surfactants, a compound selected from the group consisting of: sodium dodecyl sulfate, cetyl trimethylammonium bromide, citric acid, or combinations of the foregoing,
    wherein a ratio of solvent/thermoplastic elastomer copolymer (v/v) is between 3/1 and 12/1.

2. The printable piezoresistive ink according to claim 1, wherein the amount of thermoplastic elastomer copolymer is between 10-30% wt/wt ink.

3. The printable piezoresistive ink according to claim 1, wherein the amount of solvent is between 50-80% wt/wt ink.

4. The printable piezoresistive ink according to claim 1, wherein the amount of conductive nanostructures is between 0.5-6% wt/wt copolymer.

5. The printable piezoresistive ink according to claim 1, wherein the ratio of solvent to copolymer (v/v) is between 5/1-10/1.

6. The printable piezoresistive ink according to claim 1, wherein the surfactant is sodium dodecyl sulfate, or mixture thereof.

7. The printable piezoresistive ink according to claim 1, wherein the amount of dispersive agent is up to 20% wt/wt filler.

8. The printable piezoresistive ink according to claim 1, wherein an amount of surfactants in the dispersive agent is up to 15% wt/wt filler.

9. The printable piezoresistive ink according to claim 1, wherein the amount of the surfactants in the dispersive agent is up to 15% wt/wt filler.

10. The printable piezoresistive ink according to claim 1, wherein the relation of surfactant with respect to the conductive filler is between 1:2 to 1:10 wt filler/wt surfactant.

11. The printable piezoresistive ink according to claim 1, wherein the metal is silver, gold, platinum, or mixtures thereof.

12. The printable piezoresistive ink according to claim 1, wherein at least one of:
    a ratio (wt/wt) of butadiene/styrene in SBS varies between 45/55 to 80/20; and
    a ratio (wt/wt) of (ethylene/butylene)/styrene in SEBS varies between 70/30 and 67/33.

13. The printable piezoresistive ink according to claim 1, wherein the conductive nanostructures are nanoparticles, nanotubes, nanowires, or nano-plates.

14. The printable piezoresistive ink according to claim 13, wherein the carbon conductive nanostructures is selected from a group consisting of: carbon black, graphite, single carbon nanotubes, multi-walled carbon nanotubes, graphene, or combinations thereof.

15. A sensor, comprising a piezoresistive ink according to claim 1 configured to provide a deformation or force sensor.

16. The printable piezoresistive ink according to claim 1, wherein the printable ink is formulated to have a viscosity range between 4000-40000 cP (m·Pa·s) at 20° C. for screen printing, a viscosity range between 4-30 cP (m·Pa·s) at 20° C. for inkjet printing, and a viscosity range between 1-50 cP (m·Pa·s) at 20° C. for spray printing.

* * * * *